United States Patent [19]
Borgos et al.

[11] Patent Number: 4,772,081
[45] Date of Patent: Sep. 20, 1988

[54] FIBER OPTIC CONNECTOR ASSEMBLY

[75] Inventors: John A. Borgos; Francis J. Bradac, both of St. Paul; Daniel J. Haumschild, Coon Rapids; Timothy R. Johnson, New Brighton, all of Minn.; Rebecca J. Lee, Albuquerque, N. Mex.

[73] Assignee: TSI Incorporated, St. Paul, Minn.

[21] Appl. No.: 907,086

[22] Filed: Sep. 15, 1986

[51] Int. Cl.$^4$ .............................................. G02B 6/36
[52] U.S. Cl. .................................. 350/96.2; 350/96.21
[58] Field of Search ................ 350/96.20, 96.21, 96.22

[56] References Cited
U.S. PATENT DOCUMENTS

| | | | |
|---|---|---|---|
| 4,167,303 | 9/1979 | Bowen et al. | 350/96.21 |
| 4,429,949 | 2/1984 | Cartier | 350/96.21 |
| 4,444,516 | 4/1984 | Dostoomian et al. | 350/96.20 X |
| 4,515,434 | 5/1985 | Margolin et al. | 350/96.21 |
| 4,549,783 | 10/1985 | Schmachtenberg, III | 350/96.20 |
| 4,553,813 | 11/1985 | McNaughton et al. | 350/96.20 |
| 4,657,340 | 4/1987 | Tanaka et al. | 350/96.20 |

FOREIGN PATENT DOCUMENTS 2502798 10/1982 France .............................. 350/96.2

Primary Examiner—John Lee
Assistant Examiner—John Ngo
Attorney, Agent, or Firm—Burd, Bartz & Gutenkauf

[57] ABSTRACT

An optical fiber connector assembly for coupling an optical fiber cable having optical fibers to an instrument equipped with a light source and a photodetector. The connector assembly has a housing accommodating a pair of ferrules that support the optical fibers. The ferrules have cone-shaped heads and generally flat forward ends. The optical fibers have ends that are flush with the flat ends of the heads. The heads of the ferrules seat into cone-shaped recesses in receptacles mounted on the instrument. The light source and photodetector are aligned with the receptacles so that the light from the light source is transmitted to a first optical fiber and the light from second optical fibers is received by the photodetector. A screw mounted on the housing is threaded into a hole in the instrument to releasably connect the housing to the instrument and locate the heads in alignment with the cone-shaped recesses in the receptacles. Biasing means associated with the ferrules continuously bias and seat the heads in the cone-shaped recesses to maintain the alignment of the ends of the optical fibers with the light source and photodetector.

18 Claims, 4 Drawing Sheets

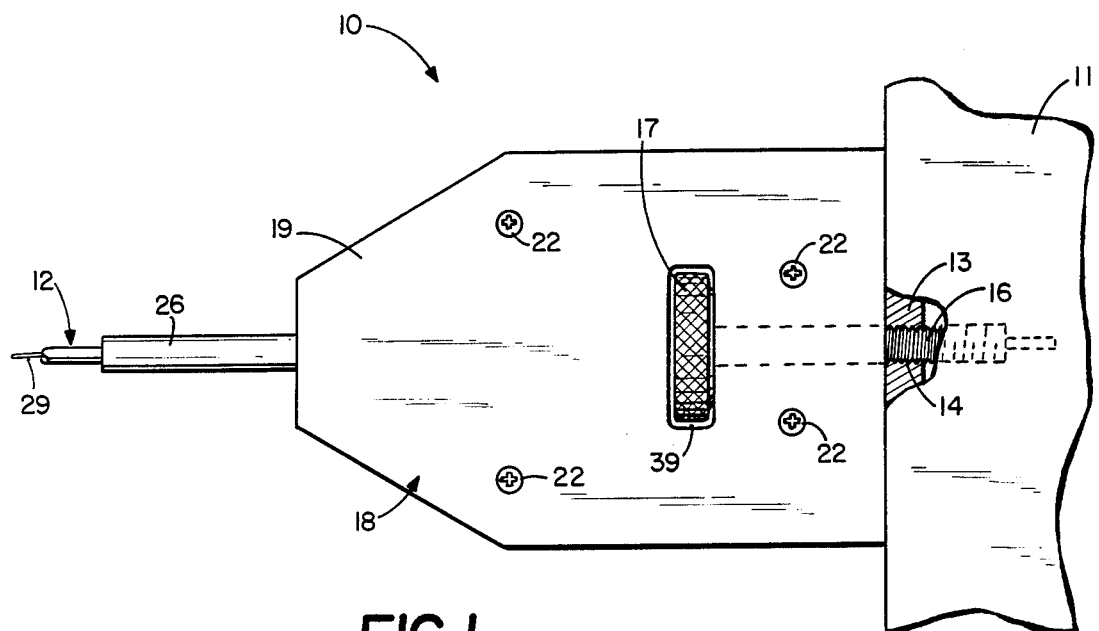
FIG. I
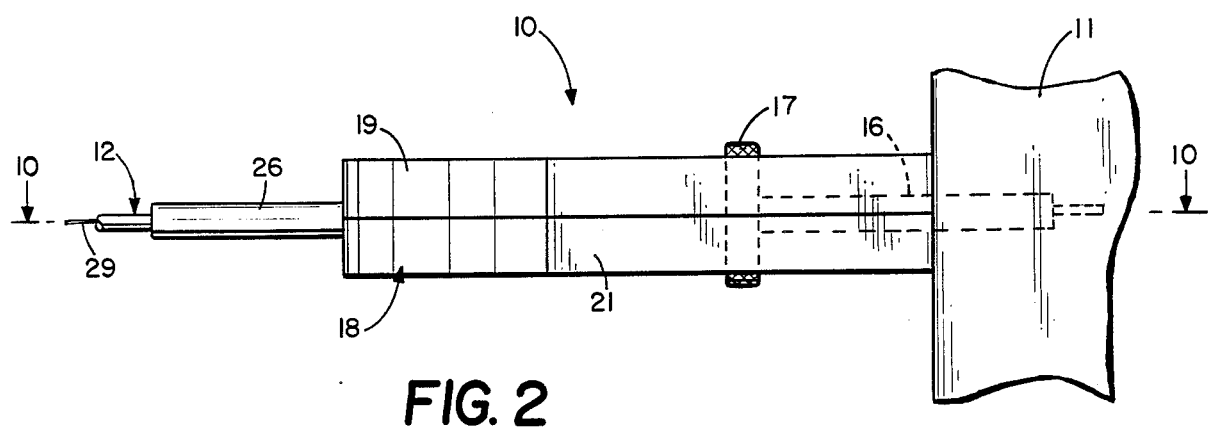
FIG. 2

FIBER OPTIC CONNECTOR ASSEMBLY

FIELD OF INVENTION

The invention relates to fiber optic connector assemblies for joining fiber optic cables to instruments and joining fiber optic cables together.

BACKGROUND OF INVENTION

Light is used by instruments to measure the flow or movement of gases, liquids and solids. These instruments include laser anemometers, blood perfusion monitors and systems that measure solid surface motion. The Doppler principle is the basic operating principle for each of these instruments. Light is focused on the moving material and is scattered by collisions which occur between photons of light and particles in the material. These collisions impart a frequency shift to the photons which is proportional to the velocity of the moving material. This frequency shift is difficult to measure directly, but by mixing the frequency-shifted light with light that has not been frequency-shifted, a slower beat frequency results. The beat frequency is also proportional to the velocity of the moving material and it can be measured. An example of this instrument is disclosed in U.S. Pat. No. 4,387,993. Flow measurements of this type require that the light have a single wavelength so these instruments usually use a laser or a laser diode as a light source. The light is focused at the measurement location by the focusing or transmitting optics. The receiving optics collect the scattered light and focus it onto the surface of a photo detector. The beat frequency results from the mixing of frequency-shifted light with light that has not been frequency-shifted on the surface of the photo detector. The photo detector converts this beat frequency to an electrical frequency which is then converted into a velocity or a flow measurement by electronic signal processing.

Optical fibers are used to replace all or part of the focusing and/or the receiving optics in these instruments. Incorporating fiber optics makes the instruments safer and easier to use and allows access to otherwise inaccessible measurement situations. A blood perfusion monitor, for example, both transmits light to and collects light from the measurement location with optical fibers. The measurement location in this case is the capillary bed just below the surface of a tissue, such as skin. The instrument non-invasively measures blood flow through the capillary bed. Using optical fibers in the blood perfusion monitor allows blood flow measurements to be made conveniently and safely because the fibers electrically isolate the patient from the instrument.

Whenever optical fibers are used to transmit light, an effective means must be used to connect the fibers to the rest of the system. The main requirement of this connection is that it provide good coupling of light from a light source into a fiber or from one fiber into another. In the case of flow-measuring instruments, the optical fiber that transmits light to the measurement location must have a small core diameter, on the order of 50 microns or less. Achieving good coupling of light from light source into fiber in these instruments is difficult. Once an instrument has been aligned, a change in location of the fiber end of even 10 microns can cause a substantial loss in the amount of light transmitted. Good alignment in the connection between the light source and the optical fiber can be achieved during the manufacturing process and the components can then be permanently fixed in place so that the connection cannot be broken. If a permanent connection between the light source and the optical fiber is not desirable, a connector having position adjustments can be used. Each time the optical fiber is connected to the light source, the user aligns the fiber so that a maximum amount of light is coupled into it. This type of connector requires that the user have the equipment and the skills necessary to make the alignment.

Optical fiber connector systems having quick connect and disconnect optical terminators without position adjustments are described by Cartier in U.S. Pat. No. 4,429,949 and McNaughton et al in U.S. Pat. No. 4,553,813. A rigid sleeve and a plurality of balls are used by Cartier to radially center optical fibers. McNaughton et al utilizes a clamp to hold an optical fiber connector on diverging ears to align optical fibers.

SUMMARY OF INVENTION

The invention is directed to a fiber optic connector assembly usable to connect and disconnect an optical fiber cable to an instrument with no substantial change in light transmitting efficiency. The connector assembly provides excellent alignment between a light source and optical fibers which requires neither adjustment nor a permanent connection between the optical fiber cable and the instrument. The optical fiber connector assembly of the invention is also unable to couple two optical fiber cables together in a manner to radially align adjacent optical fiber ends.

An embodiment of the optical fiber connector assembly couples an optical fiber cable with an instrument. The cable has a plurality of optical fibers for transmitting light. The instrument has a panel operable to support a connector housing. The housing has an end located adjacent the panel provided with a recess. A releasable fastener holds the housing in engagement with the panel. The housing has means to hold an optical fiber cable and passage means for accommodating the separate optical fibers emanating from the cable. Ferrule means are retained in the housing for supporting the optical fibers. Each ferrule means has a body and a cone-shaped head. The head terminates in a forward flat end. The optical fibers have ends that are flush with the forward end of the head. Members mounted on the panel have cone-shaped recesses for accommodating the cone-shaped head to accurately align the ends of the optical fibers with a light source and a photodetector. In one form of the connector assembly, the housing accommodates two ferrules each having cone-shaped heads. One ferrule is used to accommodate an optical fiber which guides light from a light source to a measurement location. The second ferrule terminates a return optical fiber or fibers which guide scattered light from the measurement location to a photodetector.

An objective of the present invention is to provide a optical fiber connector assembly which can be easily connected to and disconnected from an instrument and which repetitively maintains and radial alignment of the ends of optical fibers with means having light transmitting or utilizing characteristics, such as a light source, a photodetector or other optical fiber. These and other advantages and features of the optical fiber connector assembly of the invention are embodied in the following detailed disclosure of an embodiment of the optical connector assembly.

DESCRIPTION OF DRAWING

FIG. 1 is a plan view of the optical fiber connector assembly of the invention coupled to an instrument;

FIG. 2 is a side elevational view of the optical fiber connector assembly of FIG. 1;

DESCRIPTION OF PREFERRED EMBODIMENT

Figure 3:
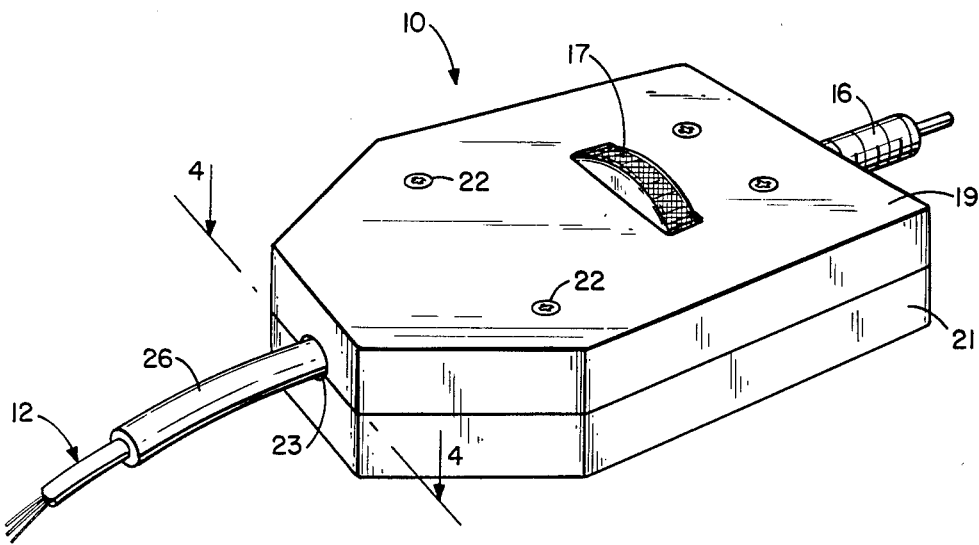
FIG. 3 is a perspective view of the optical fiber connector assembly of FIG. 1.
Figure 5:
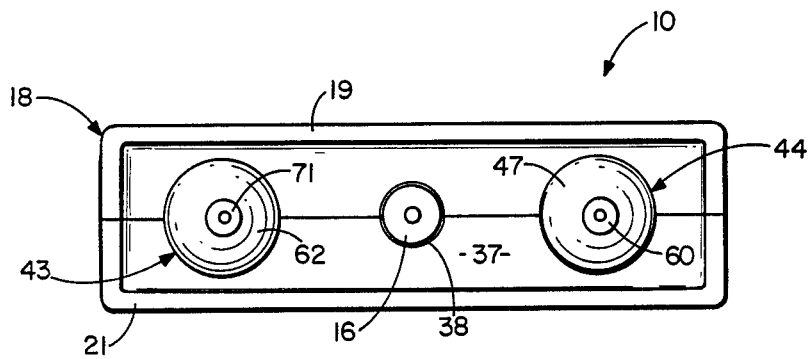
FIG. 5 is an enlarged end view of the right or forward end of the optical fiber connector assembly of FIG. 3.

Referring to FIGS. 1 and 2, there is shown a fiber optic connector assembly of the invention indicated generally at 10 coupled to an instrument 11, such as a blood perfusion monitor. Instrument 11 includes laser anemometers, blood perfusion monitors, systems that measure solid surface motion and fiber optics communications systems. Examples of these instruments are shown in U.S. Pat. Nos. 4,387,993 and 4,596,254. Connector assembly 10 joins a optical fiber cable 12 to front panel 13 of instrument 11. Front panel 13 has a threaded hole 14 receiving a screw 16. Screw 16 is attached to a knob 17 that is rotatable to join and hold connector to instrument 11. Other support structures in lieu of panel 13 can be used to hold housing 18.

Figure 4:
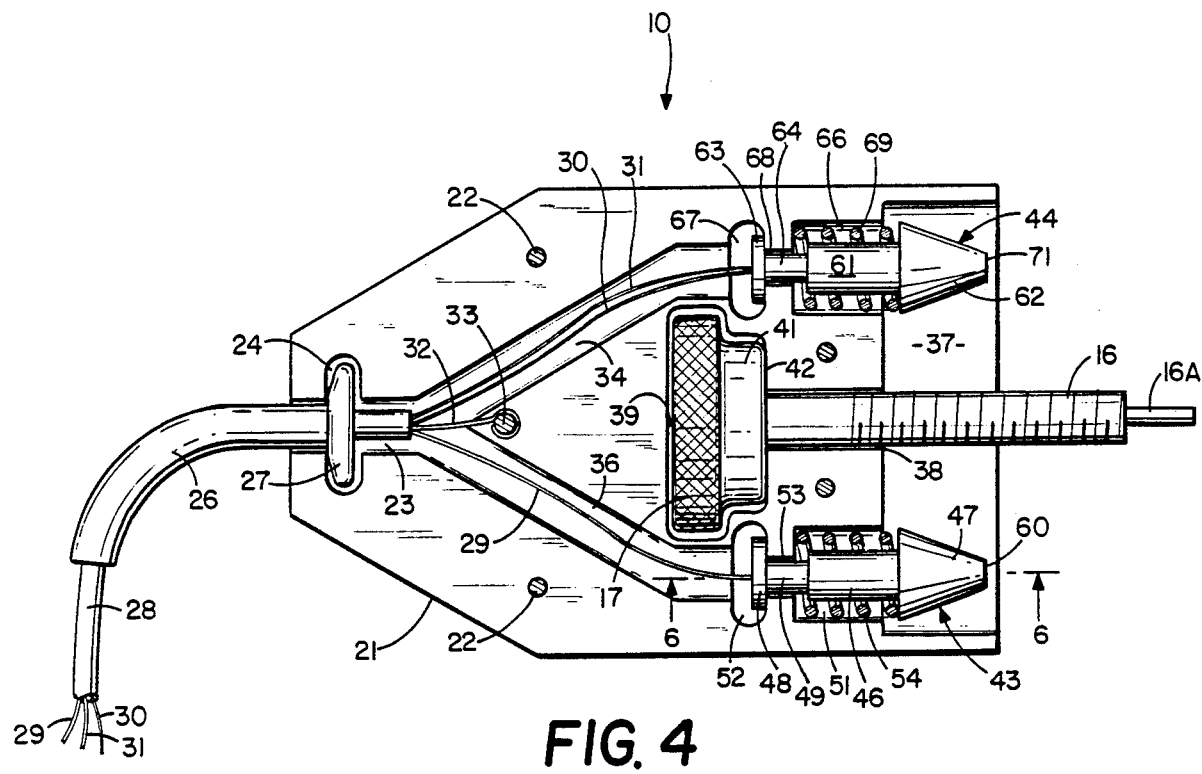
FIG. 4 is an enlarged sectional view taken along the line 4—4 of FIG. 3.

Connector assembly 10 has a housing, indicated generally at 18, made of plastic or similar non-electrically conductive material. Housing 18 has an upper casing 19 and a lower casing 21 secured together with a plurality of screws 22. Casing 19 and 21 are a mateable set. The following description is limited to casing 21. As shown in FIG. 4, the rear portion of casing 21 has a passage 23 interrupted with a lateral recess 24. A flexible boot 26 having an annular flange 27 is located in lateral recess 24. Boot 26 fits about optical cable 12 to protect cable 12 from breaking at the junction with housing 18. Boot 26 fits over jacket 28 that surrounds optical fibers 29, 30, and 31. Aramid fibers 32 surround optical fibers 29, 30, and 31 inside of jacket 28 to protect and provide strain relief for the optical fibers. A screw 33 anchors the aramid fibers 32 to housing 18 to prevent separation of cable 12 from housing 18. Other types of optical cables having different axial strain relief structures can be used with connector assembly 10.

Passage 23 leads to diverging channels 34 and 36 that are open to a cavity or recess 37 in the forward end of housing 18. The center of housing 18 has a passage 38 accommodating screw 16. Passage 38 extends between recess 37 and a transverse opening 39 accommodating knob 17. Knob 17 has an annular boss 41 that bears against an annular shoulder 42 on housing 18 to hold connector 10 in a tight relationship relative to instrument 11 when screw 16 is turned into threaded hole 14.

Optical fiber 29 is connected to a first ferrule 43. Optical fibers 30 and 31 are connected to a second ferrule 44. Ferrule 43 has a cylindrical shank or body 46 joined to a conical shaped head 47. A circular stop 48 is joined to the rear end of body 46 with a neck 49. Body 46 is located within a cavity 51 forming the terminal end of channel 36. A lateral recess 52 accommodates stop 48. Stop 48 is larger than passage 53 to retain ferrule 43 in limited movable assembled relation within housing 18. A coil spring 54 located about body 46 biases ferrule in a forward direction and retains stop 48 in engagement with housing 18. Spring 54 also allows ferrule 43 limited radial movement relative to housing 18.

Figure 6:
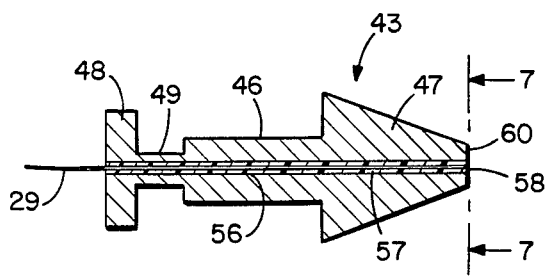
FIG. 6 is an enlarged sectional view taken along the line 6—6 of FIG. 4.
Figure 7:
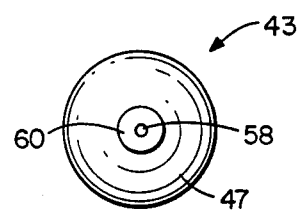
FIG. 7 is an end view taken along the line 7—7 of FIG. 6.

As shown in FIG. 6, ferrule 43 is a one-piece member having a longitudinal hole 56. Optical fiber 29 extends through hole 56. An epoxy 57 in hole 56 fixes the position of optical fiber 29 relative to ferrule 43. The forward end 58 of fiber 29 is polished until it is smooth and flush with the flat front face 60 of head 47. As shown in FIG. 7, end 58 of fiber 29 is centered in front face 60. End 58 of optical fiber 29 is centered on ferrule head 47 by means of a grinding process performed after the optical fiber 29 has been epoxied to the ferrule. The cone-shaped head 47 has a slightly oversized taper. The ferrule and the fiber are centered on a grinder operable to precision grind the outer conical surface of head 47 to ensure concentricity with end 58 of optical fiber 29. Head 62 of ferrule 44 is made in the same manner. Returning to FIG. 4, ferrule 44 has a cylindrical shank or body 61 joined to a conical-shaped head 62. A stop 63 is connected to body 61 with a neck 64. Body 61 is located in a cavity 66 in housing 18. Neck 64 extends through a passage 68 to position stop 63 in a lateral recess 67. A coil spring 69 biases ferrule 44 in a forward direction. Optical fibers 30 and 31 extend through a hole along the longitudinal axis of ferrule 44. Epoxy secures the fibers to ferrule 44. The forward end 71 of head 62 is polished so that the ends of the fibers 30 and 31 are centrally located and flush with end 71.

When the upper and lower casings 19 and 21 are secured together the bodies 46 and 61 of ferrules 43 and 44 are located in cylindrical recesses 51 and 66. Springs 54 and 69 bias heads 47 and 62 outwardly into end recess 37. Stops 48 and 63 engage casings 19 and 21 to limit the outward movement of ferrules 43 and 44 and retain heads 47 and 62 in end recess 37. Recesses 52 and 67 have widths that are greater than the thickness of stops 48 and 63 thereby allowing the ferrules to have limited longitudinal movement relative to housing 18. Springs 54 and 69 allow ferrules 43 and 44 to have limited radial movement within housing 18.

Figure 8:
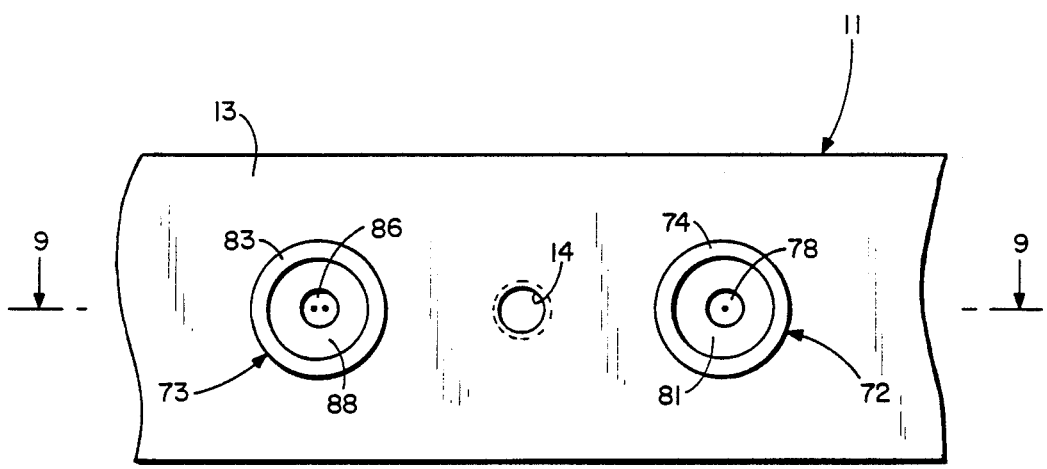
FIG. 8 is an enlarged front view of the panel with connector removed from the panel.
Figure 9:
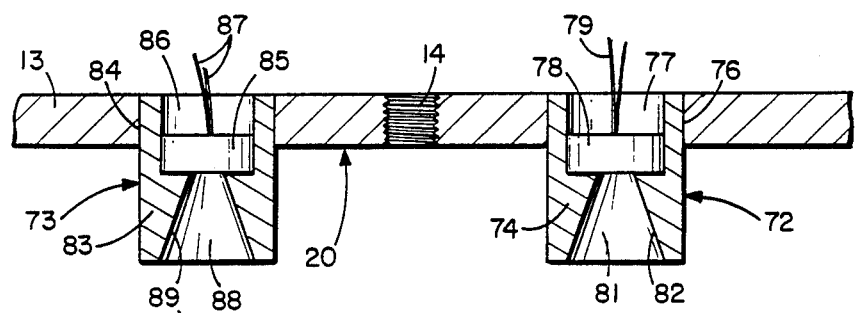
FIG. 9 is a sectional view taken along the line 9—9 of FIG. 8.

Referring to FIGS. 8 and 9, there is shown the front panel 13 of instrument 11 and female members or receptacles 72 and 73 for the heads 47 and 62 of ferrules 43 and 44. Receptacle 72 has a cylindrical body 74 located in a hole 76 in front panel 13. Body 74 is pressed into hole 76 or attached thereto with suitable adhesives or threads. The back of body 76 has a cylindrical recess 77 accommodating a light source 78, such as a light emitting diode or a laser, or provide access for a beam of light from a remote source. A plurality of conductors 79 coupled to light source 78 provides power from the operating circuit of instrument 11. Body 74 has a front truncated cone-shaped hole 81 formed by a cone-shaped side wall 82. Wall 82 is open to recess 77 to expose the central portion of light source 78 to the end of optical fiber or fibers.

Receptacle 73 is identical to receptacle 72. Receptacle 73 has a cylindrical body 83 pressed into a hole 84 in panel 13. The back of body 83 has a recess 86 accommodating a photodetector 85. A plurality of conductors 87 couple photodetector 85 with the circuit of instrument 11. Body 83 has a cone-shaped side wall 89 forming a truncated cone-shaped hole 88. The bottom of hole 88 is open to recess 86 to expose the ends of optical fibers 30 and 31 to photodetector 85. The receptacle 72 and 73 are located on opposite sides of threaded hole 14.

Figure 10:
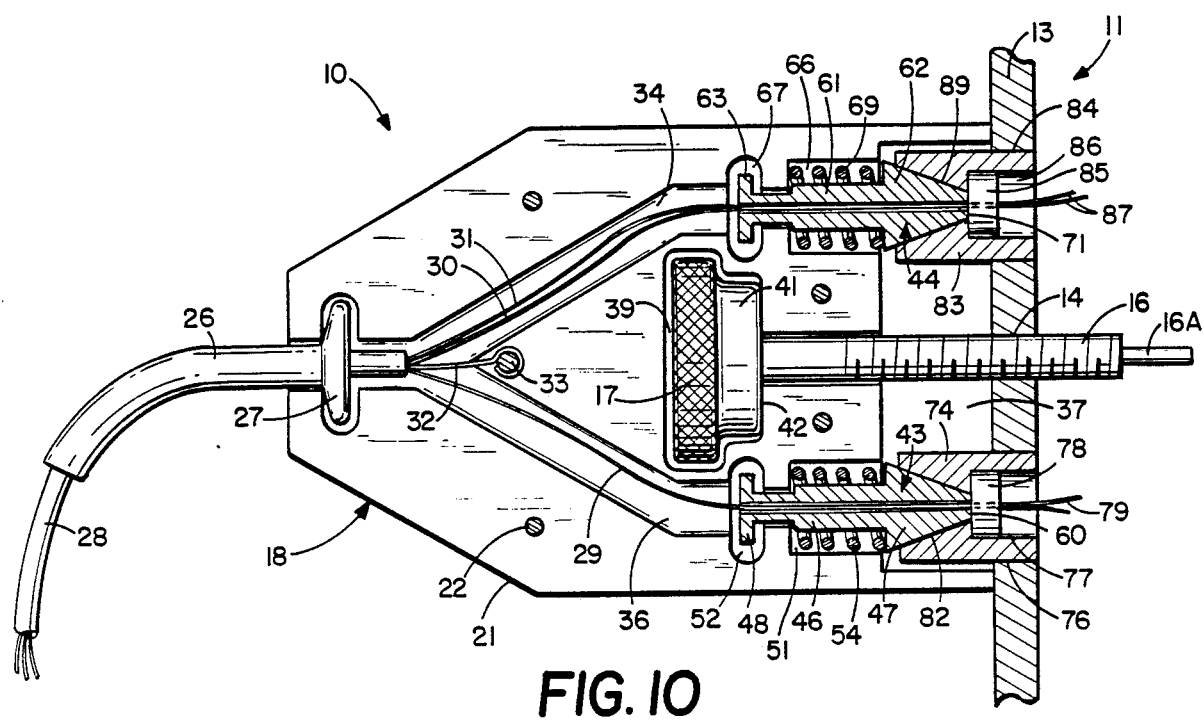
FIG. 10 is a sectional view taken along the line 10—10 of FIG. 2.

Referring to FIG. 10, optical fiber connector housing 18 is mounted in assembled relation with front panel 13 of instrument 11. Other supports can be used to hold housing 18. The forward pilot end 16A of screw 16 is initially aligned with threaded hole 14. This aligns housing 18 and ferrules 43 and 44 mounted in housing 18 with receptacles 74 and 83. Screw 16 is manually turned with knob 17 to thread screw 16 into hole 14. Screw 16 with head 17 bearing on shoulder 42 of housing 18 holds the forward end of housing 18 surrounding cavity 37 in tight engagement with panel 13. Ferrules 43 and 44 and receptacles 74 and 83 located in cavity 37 are protected by housing 18. As shown in FIG. 2, diametric opposite portions of knob 17 extend away from opposite sides of housing 18 to facilitate the manual manipulation of screw 16. Heads 47 and 62 simultaneously move into the cone-shaped recess of receptacles 74 and 83 respectively when the screw 16 is threaded into hole 14. Head 47 of ferrule 43 fits into the cone-shaped hole 82 in receptacle 74. The cone-shaped side wall of head 47 is seated in surface engagement with the cone-shaped side wall 82. The forward flat end 60 of head 47 is located adjacent the side of light source 78. Head 47 locates the end of the optical fiber 29 in precise radial alignment with the end of an optical fiber or location of the light source. Spring 54 continuously biases head 47 into the hole in receptacle 74 so as to maintain its aligned position with respect to the receptacle and light source 78.

Cone-shaped head 62 of ferrule 44 is located in the cone-shaped hole 89 in receptacle 83. The outside cone-shaped surface of head 62 is seated in surface engagement with the cone-shaped side wall 89 to accurately align the optical fibers with photodetector 85. The flat end 71 of head 62 is located in contiguous relationship to the inside surface of photodector 85 to align the ends of optical fibers 30 and 31 with selected portions of photodetector 85. Spring 69 continuously biases head 62 in surface engagement with the side wall 89 and thereby maintaining the radial alignment of the ends of the optical fibers 30 and 31 with photodetector 85.

Each of the ferrules 43 and 44 has limited radial movement relative to housing 18 as they are free to move in any circumferential direction in recesses 51 and 66. Springs 54 and 69 allow the ferrules 43 and 44 to have limited radial movement as well as limited longitudinal movement relative to housing 18. In the event that there is any misalignment of the cone-shaped heads 47 and 62 relative to receptacles 74 and 83, the ferrules are free to compensate for any errors in alignment so as to ensure the desired precise alignment of the ends of the optical fibers with the light source 78 and photodetector 85.

The optical fiber connector assembly 10 insures that the ends of optical fibers 29, 30, and 31 are located in precisely the same location each time a connection is made. Housing 18 does not push directly on ferrules 43 and 44 when the connection is made. The contact between housing 18 and ferrules 43 and 44 is made through coil springs 54 and 69. The limited longitudinal and radial movement of ferrules 43 and 44 allows the ferrules to be guided into a selected precise position in the receptacle 74 and 83. The prior art optical connectors do not have this capability. Housing 18 does not directly force head 47 and 62 into receptacles 74 and 83 respectively. The flexible biasing members, such as springs 54 and 69, allow secure mounting of ferrules 43 and 44 on housing 18 and ensure that the heads of the ferrules are seated to maximum depth in receptacles 74 and 83 each time a connection is made. Ferrules 43 and 44 also have limited lateral movement which allow for the centering of heads 47 and 62 in their respective cone-shaped recess holes in receptacles 74 and 83 respectively in the event there is any misalignment of the ferrules and receptacles.

Connector housing 18 is released from instrument 11 by turning knob 17 to remove screw 16 from thread hole 14 in panel 13. Housing 18 is then withdrawn from panel 13. Heads 47 and 62 move out of receptacles 74 and 83. Stops 48 and 63 prevent ferrules 43 and 44 from being separated from housing 18.

While there has been shown and described a preferred embodiment of the optical fiber connector assembly of the invention it is understood the changes in the structure, materials, and uses may be made by those skilled in the art without departing from the invention. For example, optical fiber connector assembly can be used to couple two optical cables together. Housings having ferrules, such as ferrules 43 and 44, can be attached to opposite sides of a support having aligned receptacles, such as receptacles 74 and 83. The invention is defined in the following claims.

The embodiments of the invention in which an exclusive property or privilege is claimed are defined as follows:

1. An optical fiber connector assembly for coupling an optical fiber cable having first and second optical fibers to an instrument having a panel and light accommodating means for the operation thereof comprising:
    a housing having a longitudinal central axis and an end, said end having a recess open to said panel, rotatable means mounted on the housing releasably connecting said housing to said instrument to hold said end in engagement with said panel, said rotatable means extended along said longitudinal central axis and having an end projected through said recess, said panel having hole means accommodating the end of the rotatable means, said end of the rotatable means and panel having cooperating means to releasably connect the rotatable means to the panel thereby hold said housing in engagement with the panel, said housing having means to connect the optical fiber cable thereto and passage means for accommodating the first and second optical fibers of said cable, first ferrule means retained in said housing for supporting the first optical fiber adjacent one side of the rotatable means, second ferrule means retained in said housing for supporting the second optical fiber adjacent the other side of the rotatable means whereby the first and second ferrules are located adjacent opposite sides of the rotatable means, said first and second ferrule means each having a body and a head joined thereto, said head having a cone-shaped outer surface and a forward end, said first and second optical fibers each having an end flush with a forward end of a head, said outer surface of each head being precision ground to concentrically locate said outer surface about said end of a fiber, and first and second receptacle means mounted on the panel in alignment with the first and second ferrule means, each receptacle means having a cone-shaped recess complimentary in size and shape to the cone-shape outer surface of the adjacent head and an opening at the small end of the recess centrally aligned with the light accommodating means, said head of the first ferrule means being located in said cone-shaped recess of the first receptacle with the forward end thereof adjacent the opening at the small end of the cone-shaped recess of the first receptacle, said head of the second ferrule means being located in said cone-shaped recess of the second receptacle with the forward end thereof adjacent the opening at the small end of the cone-shaped recess of the second receptacle, said cone-shaped surfaces of the heads cooperating with the cone-shaped recesses to locate the ends of the optical fibers in precise radial alignment with the light accommodating means.

2. The assembly of claim 1 wherein: said housing has first and second cavities accommodating said bodies of the first and second ferrule means, biasing means for biasing each head in a forward direction to hold the head in said cone-shaped recesses in the first and second receptacle means, and stop means connected to each body and engageable with said housing to limit forward movement of the head thereon and allow limited backward movement of said head.

3. The assembly of claim 2 wherein: said means for biasing each head includes spring means surrounding the body and engageable with the head and housing.

4. The assembly of claim 1 wherein: said rotatable means releasably connecting said housing to said panel includes a single threaded screw, said hole means comprising a single threaded hole accommodating said screw, said screw and threaded hole cooperating with each other to hold the housing on the panel with the heads positioned in said cone-shaped recesses in the first and second receptacle means.

5. The assembly of claim 4 wherein: said housing has an opening and a passage connecting the opening with the recess, said threaded screw having a knob located in said opening and a body connected to the knob extended through said passage, said body having threads engagable with threads of the threaded hole.

6. The assembly of claim 5 wherein: said knob projects outwardly from at least one side of the housing to facilitate manual turning of the knob.

7. The assembly of claim 5 wherein: said knob projects outwardly from opposite sides of the housing to facilitate manual turning of the knob and body having threads.

8. The assembly of claim 1 wherein: said optical fiber cable includes strain relieving means surrounding the optical fiber, and means connecting the strain relieving means to the housing to prevent strain forces from being applied to the optical fiber.

9. The assembly of claim 1 wherein: said light accommodating means includes a light source aligned with the first receptacle means and a photodetector aligned with the second receptacle means.

10. The assembly of claim 1 wherein: said housing has a first cavity accommodating the body of the first ferrule means, first biasing means for biasing the head of the first ferrule means in a forward direction, first stop means connected to the body of the first ferrule means engageable with said housing to limit forward movement of the head of the first ferrule means, said housing further having a second cavity accommodating the body of the second ferrule means, second biasing means biasing the head of the second ferrule means in a forward direction, and second stop means connected to the body of the second ferrule means engageable with the housing to limit forward movement of the head of the second ferrule means.

11. The assembly of claim 10 wherein: the first biasing means includes first spring means surrounding the body of the first ferrule means, said first spring means being engageable with said head of the first ferrule means and housing to bias the head of the first ferrule means in a forward direction, and said second biasing means includes second spring means surrounding the body of the second ferrule means, said second spring means surrounding the body of the second ferrule means, said second spring means being engageable with said head of the second ferrule means and housing to bias the head of the second ferrule means in a forward direction.

12. An optical fiber connector assembly for coupling an optical fiber cable having at least one optical fiber to a support associated with means for transmitting or receiving light, said support having threaded means comprising: a housing having an opening and a passage connecting the opening with a forward end of said housing, means releasably connecting said housing to said support to hold said housing in engagement with said support, said means releasably connecting said housing to the support including threaded body means extended through said passage and engageable with the threaded means and a knob located in the opening attached to the body means, said housing having means to connect an optical fiber cable thereto and passage means for accommodating an optical fiber of said cable, ferrule means mounted on said housing for supporting the optical fiber, said ferrule means including a head having a cone-shaped outer surface and a forward end, said optical fiber having an end flush with and located in the center of said forward end, said cone-shaped outer surface of the head being concentrically located about said end of the optical fiber, and receptacle means having a cone-shaped recess complementary in size and shape to the cone-shaped outer surface of the head, said cone-shaped recess being aligned with and open to a means for transmitting or receiving light, said head being located in said cone-shaped recess with said cone-shaped surface of the head cooperating with the cone-shaped recess to locate the end of the optical fiber in precise radial alignment with said means for transmitting or receiving light.

13. The assembly of claim 12 wherein: said knob projects outwardly from at least one side of the housing to facilitate manual turning of the knob.

14. The assembly of claim 12 wherein: said optical fiber cable includes strain relieving means surrounding the optical fiber and means connecting the strain relieving means to the housing to prevent strain forces from being applied to said optical fiber.

15. An optical fiber connector assembly for coupling an optical fiber cable having at least one optical fiber to a support associated with means for transmitting or receiving light comprising: a housing, means releasably connecting said housing to said support to hold said housing in engagement with said support, said housing having means to connect an optical fiber cable thereto and passage means for accommodating an optical fiber of said cable, ferrule means mounted on said housing for supporting the optical fiber, said ferrule means including a head having a cone-shaped outer surface and a forward end, said fiber having an end flush with said forward end and located in the center of the forward end of the head, and receptacle means having a cone-shaped recess complementary in size and shape to the cone-shaped outer surface of the head, said cone-shaped recess being longitudinally aligned with and open to a means for transmitting or receiving light, said head being located in said cone-shaped recess with said cone-shaped surface of the head cooperating with the cone-shaped recess to locate the end of the optical fiber in radial alignment with said means for transmitting or receiving light, said means releasably connecting said housing to said means or transmitting or receiving light includes first threaded means associated with said support and second threaded means mounted on said housing, said first and second threaded means cooperating with each other to hold the housing in a fixed position relative to said support with the head positioned in said cone-shaped recess in the receptacle means, said housing having an opening in the central portion thereof and a passage connecting the opening with the forward end thereof, said second threaded means having a knob projected outwardly from at least one side of the housing to facilitate manual turning of the second threaded means.

16. The assembly of claim 15 wherein: said housing has a first passage for a first optical fiber and a second passage for a second optical fiber, said ferrule means comprising a first ferrule retained in said housing in alignment with said first passage for supporting the first optical fiber and a second ferrule retained in said housing aligned with the second passage for supporting the second optical fiber, each of said first and second ferrules having a head joined thereto, said head having a cone-shaped outer surface and a forward end, said first and second optical fibers having ends flush with said forward ends of the first and second ferrules respectively, said receptacle means comprising a first member having a first cone-shaped recess for accommodating a first cone-shaped head and a second member having a second cone-shaped recess for accommodating the second cone-shaped head, said means for transmitting or receiving light being associated with said first and second members.

17. The assembly of claim 16 including: biasing means for biasing the first head in a forward direction, first stop means connected to the first ferrule engageable with said housing to limit forward movement of the first head, second biasing means biasing the head of the second ferrule in a forward direction, and second stop means connected to the second ferrule engageable with the housing to limit forward movement of the second head.

18. The assembly of claim 17 wherein: first biasing means includes a first spring means surrounding the first ferrule, said first spring means being engageable with said first head and housing to bias the first head in a forward direction, said second biasing means includes a second spring means surrounding the second ferrule, said second spring means being engageable with second head and housing to bias the second head in a forward direction.

* * * * *